United States Patent [19]

Call

[11] Patent Number: 4,912,466
[45] Date of Patent: Mar. 27, 1990

[54] AUDIO FREQUENCY BASED DATA CAPTURE TABLET

[75] Inventor: James Call, Larchmont, N.Y.

[73] Assignee: NPD Research Inc., Port Washington, N.Y.

[21] Appl. No.: 245,740

[22] Filed: Sep. 15, 1988

[51] Int. Cl.⁴ .............................................. G06F 3/02
[52] U.S. Cl. .......................................... 341/20; 341/5; 340/709; 250/221; 178/18; 235/462
[58] Field of Search .................... 455/2; 379/92, 97; 358/84; 235/386, 436, 454, 462; 250/221, 557; 341/5, 20, 21; 340/709, 825.73, 825.74, 870.28, 870.29; 367/197; 434/322, 350, 351, 116; 178/87, 18

[56] References Cited

U.S. PATENT DOCUMENTS

| | | | |
|---|---|---|---|
| 2,552,622 | 5/1951 | De Neergaard | 178/18 |
| 3,655,102 | 5/1972 | Townsend et al. | 178/18 |
| 3,983,364 | 7/1972 | Firehammer et al. | 235/454 |
| 4,221,328 | 9/1980 | Kramer | 235/454 |
| 4,275,395 | 6/1981 | Dewey et al. | 178/18 |
| 4,335,303 | 6/1982 | Call | 235/463 |
| 4,355,372 | 10/1982 | Johnson et al. | 364/900 |
| 4,445,028 | 4/1984 | Huber | 235/462 |
| 4,575,581 | 3/1986 | Langberg | 178/18 |
| 4,670,743 | 6/1987 | Zemke | 178/18 |
| 4,782,327 | 11/1988 | Kley et al. | 341/20 |

Primary Examiner—Donald J. Yusko
Assistant Examiner—Edwin C. Holloway, III
Attorney, Agent, or Firm—Bryan, Cave, McPheeters & McRoberts

[57] ABSTRACT

An audio frequency based data capture tablet (26) includes a working surface (210) upon which a data collection document having marked responses is placed. A movable cursor (212, 222), which is mechanically disposed above the working surface (210), produces an audio signature indicating both its position and relative motion orthogonally. shaded bars (214, 216) along the top and sides of the tablet (26) which comprise binary encoded sections, cause a composite of audio frequencies to be produced. The intersecting members (212, 222) of the movable cursor are orthogonally disposed with the x-axis member including seven phototransistors (220) as does the y-axis member (225), with each of the phototransistors (220, 223) being uniquely associated with an audio frequency oscillator (330-342, 334-356) whose outputs are mixed and combined (400) to provide a composite audio signature; and optically alignable with the shaded bars (214, 216). The movable intersecting members (214, 222) also comprise a plurality of windows (225, 227), with the intersecting windows (225, 227) being aligned so as to intersect over a marked response area (229) to define the unique position of the answer along the working surface (210).

38 Claims, 16 Drawing Sheets

AUDIO FREQUENCY BASED DATA CAPTURE TABLET

CROSS REFERENCE TO RELATED APPLICATIONS

This application is related to my contemporaneously filed, commonly owned, copending U.S. patent application Ser. No. 245,739 entitled "Audio Frequency Based Market Survey Method," the contents of which is specifically incorporated by reference herein its entirety.

TECHNICAL FIELD

The present invention relates to an audio frequency based data capture tablet capable of obtaining market survey information and other data collection information in the form of audio information for storage and transmission thereof for remote processing and computer analysis.

BACKGROUND OF THE ART

Systems for use in field data collection, at diverse locations, to determine radio/TV audience listening behavior, or other audience preferences such as survey/questionnaire responses, the movement or status of bar-coded items in Production, purchase, or other market transactions, or to convert manually completed questionnaires to computer-readable form are well known in the art, such as disclosed in U.S. Pat. Nos. 4,355,372 and 4,603,232, by way of example. For example, prior art attempts at monitoring audience response to radio or television programming have included continuous live monitoring of broadcasts looking for real time matches on the fly of data, such as disclosed in U.S. Pat. No. 2,630,366, and the digitized storage of selected program segments for subsequent audio match, such as disclosed in U.S. Pat. Nos. 4,499,601, 4,450,531, and 4,511,917. In addition prior art electronic polling or audience survey systems are well known in the art, such as disclosed in U.S. Pat. Nos. 3,725,603; 3,587,077; 4,566,030; 4,377,870; 4,216,497; and 4,290,141; and British Pat. No. 1,536,414. However, none of these prior art systems discloses a system or method for discrete synchronized sample monitoring and storage of ambient sounds at a plurality of diverse locations which are analyzed against a remote synchronized master recording and used to provide an audience survey, nor does such prior art disclose a system in which audio information corresponding to bar code data may also be stored at the diverse locations, such as UPC type data by way of example, for providing supplemental market survey data of other audience preferences to the central location.

In most prior art cases known to applicants, each specific data collection need has resulted in specialized hardware and systems. For example, patterns of responses have been manually entered on survey response paper questionnaires by blackening pre-designated response areas, depending on the desired answer to a survey question. These paper forms are then "read" by specialized optical mark reading equipment (OMR) in which an array of photo cells detect, in a binary fashion, the presence or absence of response marks. The binary Pattern output is then processed by a digital computer. The optical mark reading equipment is specialized to such a degree that while it capably reads such marks, it is practically useless, for example, for reading bar codes. Similarly, existing equipment for reading bar codes is generally not practical for reading optical mark sheets. Nevertheless, it usually is desirable to collect multiple types of information, for example in market research, in a single setting. This is because the variety of types of information, (bar code, alpha-numeric, verbal responses, images, etc.) are generally fundamentally related. In market research, for example a purchase transaction (characterized by numbers for quantity and outlet) is related to the product (characterized by a bar code) and a perceived need or product opinion (as revealed by answers to survey questions) and is influenced by advertising (as heard in an audio/visual format over radio or TV). The market research industry, as well as numerous other industries including manufacturing and distribution, have a great need for single source data, but the unified collection of such data, using systems described in the prior art, is not economically feasible due to the specialization, diversity and incompatibility of the data collection systems involved. The recombining and correlating of such diversely gathered data for subsequent analysis is time consuming and error prone, and when it can be done at all, results, ultimately, in a social cost through higher consumer prices or less efficient market decisions. The specialization of data collection, recording and transmission approaches is the result of incompatible data formats and transmission protocols that have become ingrained.

The specialization noted above has perhaps been best typified in bar-code reading systems. Miniaturization of microcomputers and solid state memories has resulted in powerful hand-held microcomputerized bar-code readers and data collection instruments which decode the bar-code immediately upon scanning, verify it by means of the normally included check digit, and store the resulting numeric data in a solid state memory in traditional binary codes. In applications where relatively few such hand-held computers are needed, for example in inventory control, they have been reasonably practical and cost-effective. However, they are still complex and relatively expensive, even with existing large scale integrated circuits.

Moreover, these systems generally translate the digitally stored data into special tones for telephone transmission. Then, at the receiving end, the tones must be reconverted back to a digital format. This process of "modulation" and "demodulation" requires complex and expensive hardware, termed "modems", to carry out the transmission process.

Thus, the prior art systems known to applicant have not proven to be both efficient and cost effective. These disadvantages of the prior art are overcome by the present invention.

DISCLOSURE OF THE INVENTION

An audio frequency based data capture tablet is provided for converting marked data responses, such as on a market survey or other data collection form, into corresponding audio information which may be recorded and transmitted to a remote data processor for analysis and processing. The data capture tablet includes a working surface on which the data collection document is placed which contains collected information stored in a response area in the form of marked data which is substantially orthogonally definable on the work surface. A pair of substantially normal binary encoded optically readable sections, such as located at the edges of the work surface, is provided and orthogonally defines a plurality of unique positions on the document response area disposed on the working surface. A movable cursor, comprising an x-axis member and a intersecting y-axis member, is mechanically disposed above the working surface, with the x-axis member being movable along the x-axis, and the y-axis member being movable along the y-axis to uniquely define an aligned position on the document response area where a given response has been marked. Each of the intersecting members of the cursor comprise a plurality of spaced apart windows optically alignable over a plurality of possible marked responses to a given data collection inquiry. The windows intersect over the marked answer to the inquiry. A plurality of phototransistors, such as seven such phototransistors, each associated with a different unique spaced apart audio frequency, such as 100 Hz spacing, is provided on each of the intersecting members in optical alignment with the binary encoded optically readable sections, such as with the x-axis providing a frequency pattern in the range of 300 Hz to 1000 Hz and each of the sections comprises a plurality of unique optically readable binary patterns uniquely defining the position of a response on the document disposed on the work surface. The movable cursor produces a composite of audio frequencies when the cursor is at the aligned position on the document response area. The x- and y-axis phototransistors produce different spaced apart patterns of audio frequencies, whereby the composite of these audio frequencies provided at the aligned position provides a unique audio signature corresponding to the marked response used on the document. An electrical resistance slide wire is also provided for providing extra or supplemental data in an expanded resolution mode.

BRIEF DESCRIPTION OF THE DRAWINGS

FIG. 9 is a block diagram of a procedure for decoding bar code audio signatures in accordance with the presently preferred method described herein;

BEST MODE FOR CARRYING OUT THE INVENTION

Figure 1:
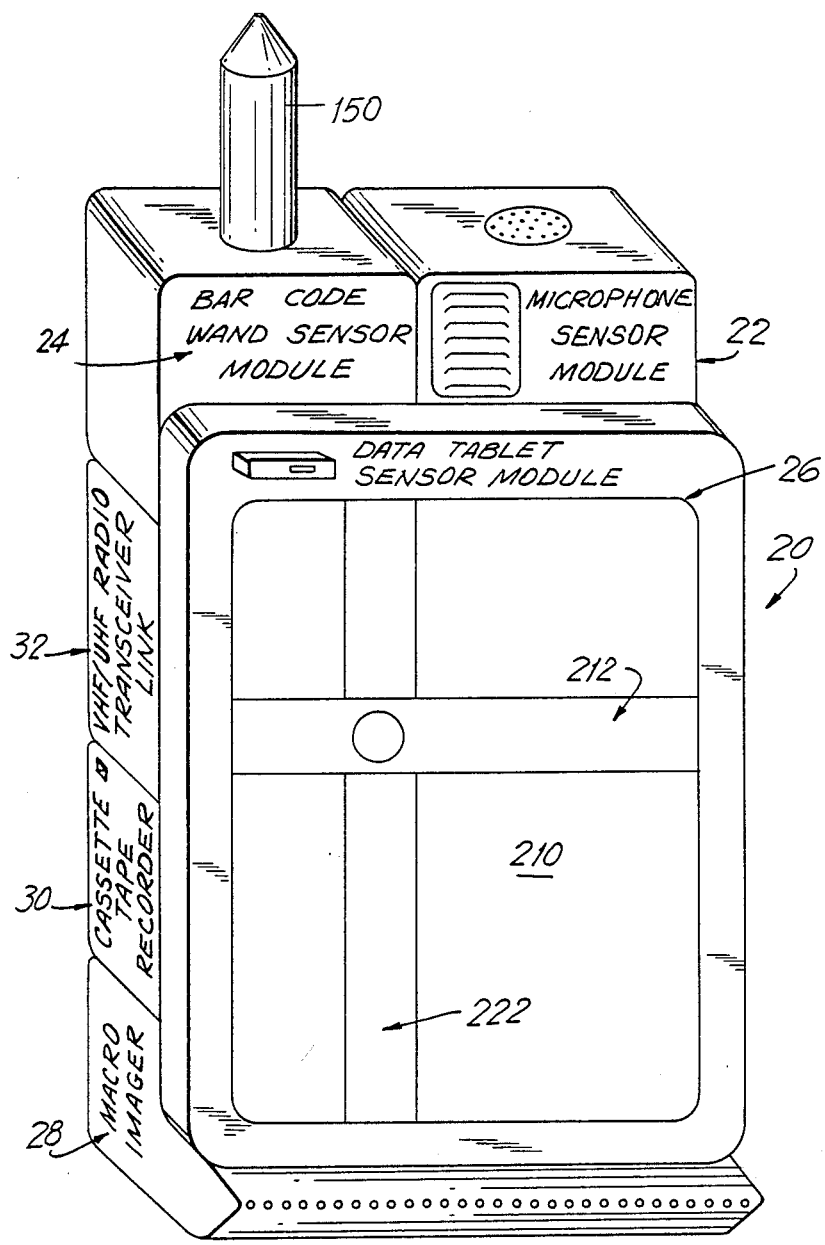
FIG. 1 is a diagrammatic illustration of an audio information input and recording device capable of use with the presently preferred method described herein.
Figure 2:
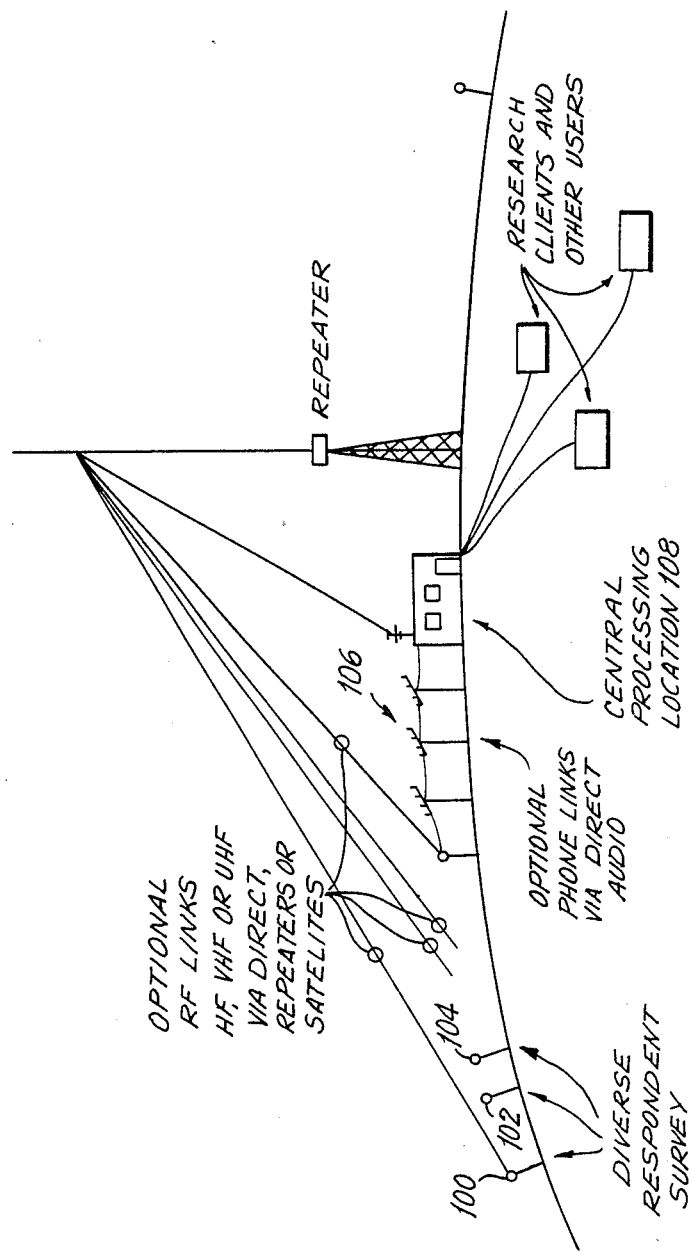
FIG. 2 is a diagrammatic illustration of a market survey data transmission system usable with the presently preferred method described herein.

Referring now to the drawings in detail, and initially to FIG. 1, a data acquisition device, generally referred to by the reference numeral 20, is shown. The data acquisition device 20 is capable of use in practicing the presently preferred method described in my copending U.S. patent application entitled "Audio Frequency Based Market Survey Method," contemporaneously filed herewith, and preferably includes a plurality of data acquisition modules 22, 24, 26, 28, each capable of storing the acquired data as an audio signal onto conventional storage media such as, for example, magnetic tape, or magnetic or laser disks. Preferably, there are four such sensor modules, 22, 24, 26, 28 shown, and a conventional audio recorder 30 and an associated conventional transmission and control subsystem 32, such as a conventional VHF/UHF radio transceiver link or telephone transmission link. As will be explained in greater detail with reference to FIG. 2, an essentially immediate reporting of audience measurement and/or other market data may be made to a central location through the use of audio information corresponding thereto.

Figure 3:
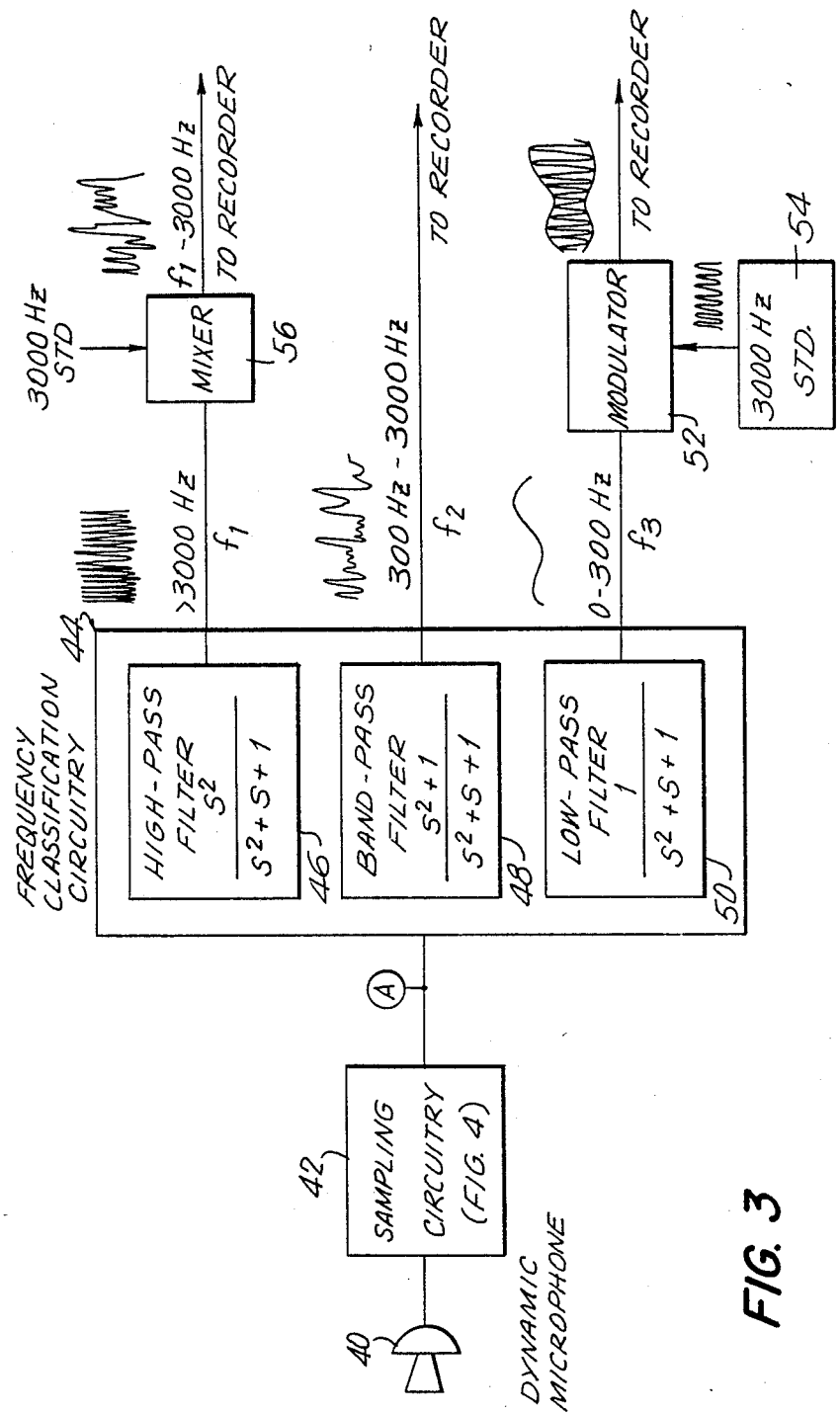
FIG. 3 is a block diagram, partially diagrammatic, of a microphone sensor module portion of the device of FIG. 1.

The microphone sensor module 22 preferably employs an audio microphone and associated conventional signal conditioning, filtering and sampling circuitry so as to preferably permit the recording of sounds with frequencies above and below the range of 300 Hz to 3,000 Hz. This range is the range that is normally transmittable over conventional telephones and FM radio communication links. Preferably, in order to store and transmit such "out-of-band" signals, a pre-filter classifies the microphone-sensed signal as under 300 Hz; from 300 Hz to 3,000 Hz, or; above 3,000 Hz. A block diagram of a typical microphone sensor 22 is shown in FIG. 3. As shown and preferred in FIG. 3, the sensor 22 comprises a conventional dynamic microphone 40, sampling circuitry 42 shown in greater detail in FIG. 4, and frequency classification circuitry 44 which preferably consists of a conventional high pass filter 46 for passing signals above 3,000 Hz, a conventional mid range band pass filter 48 for passing signals in the range of 300 Hz to 3,000 Hz, and a conventional low pass filter 50 for passing signals less than 300 Hz. Signals less than 300 Hz output through filter 50 are recorded by preferably using them to modulate a 3,000 Hz tone via conventional modulator 52 and tone generator 54. Signals in the "normal" range of 300 to 3,000 Hz output from filter 48 are preferably recorded and processed without conditioning, other than for amplitude. Finally, signals greater than 3,000 Hz, which are output from filter 46, are preferably mixed with a conventionally provided 3,000 Hz signal through heterodyning, via conventional mixer 56, in order to produce a sum and difference frequency, the difference frequency preferably being recorded as the signal of interest. This approach is preferably used once for signals up to 6,000 Hz, which would provide a 3,000 Hz "beat note", but may, if desired, be cascaded in each succeeding 3,000 Hz band up to the upper limit of commercially interesting frequencies.

Figure 4:
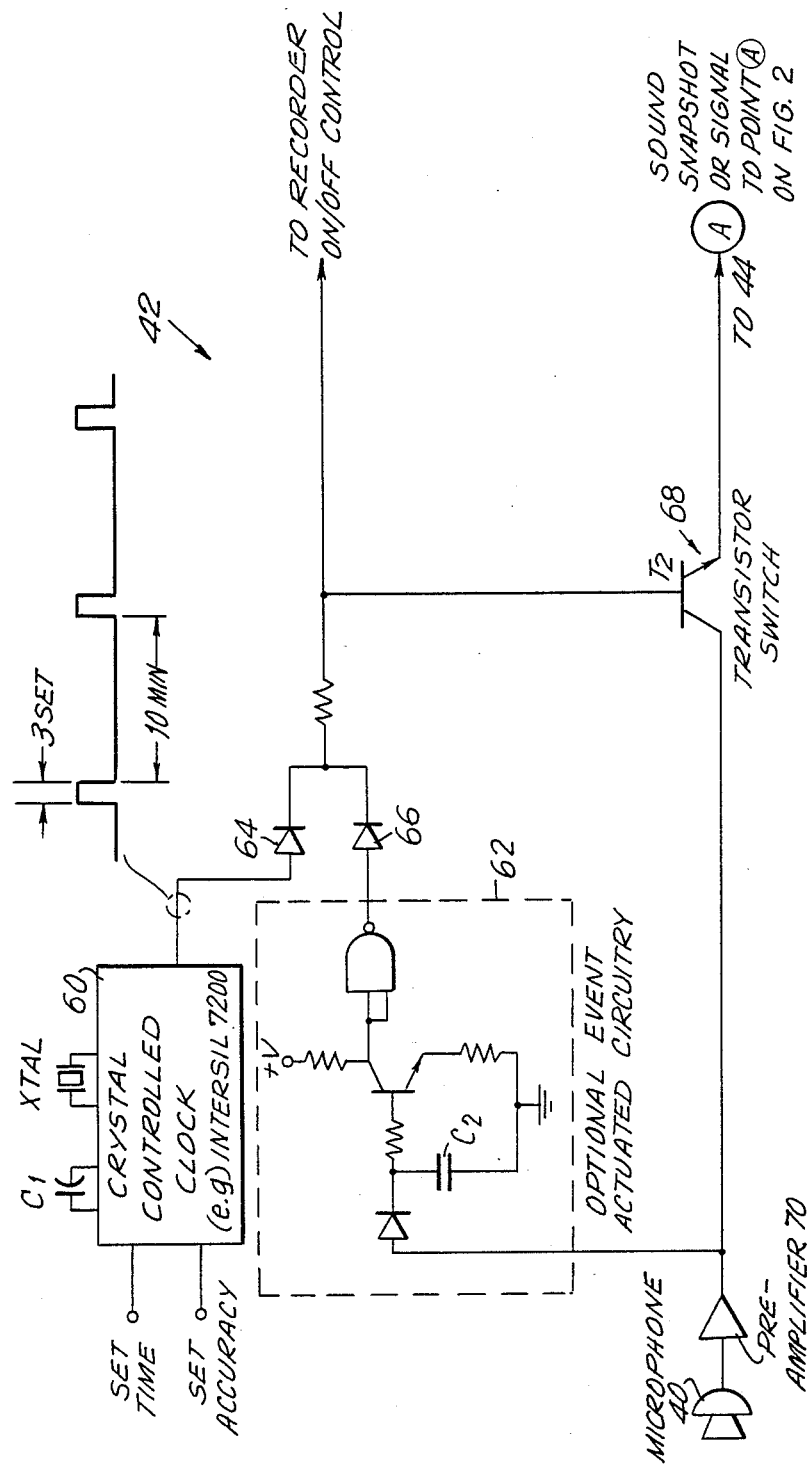
FIG. 4 is a schematic diagram, partially in block, of a sampling circuit capable of providing the audio snapshot sampling window employed in the presently preferred method described herein.

Referring now to FIG. 4, the sampling circuitry 42 is shown in greater detail. This sampling circuitry 42 is preferably adjustable so as to provide a presettable or event driven sample of microphone sound. For example, in radio or TV audience preference measurement in connection with an audience survey, it might be desirable to record 3 seconds of ambient sound at preordained or predetermined 5 minute intervals to provide an audio snapshot of the radio and/or television listening audience at that location at the various diverse locations where respondents are for later comparison to synchronized master recordings of the known radio and/or television program material playing in that area at the sampled time. In this way, listener or TV-viewing behavior is determined. As shown and preferred in FIG. 4, the sampling circuitry 42 preferably includes a conventional crystal controlled clock 60, such as an Instersil 7200 and, if desired, event actuated circuitry 62, which basically is a gating circuit whose output, together with that of clock 60, is provided in parallel through diode pair 64-66 to the base of a transistor switch 68, whose output is connected to the input of frequency classification circuit 44, with the base being connected in parallel to the recorder on/off control. As also shown and preferred, a conventional preamplifier 70 may be used with microphone 40.

Figure 5:
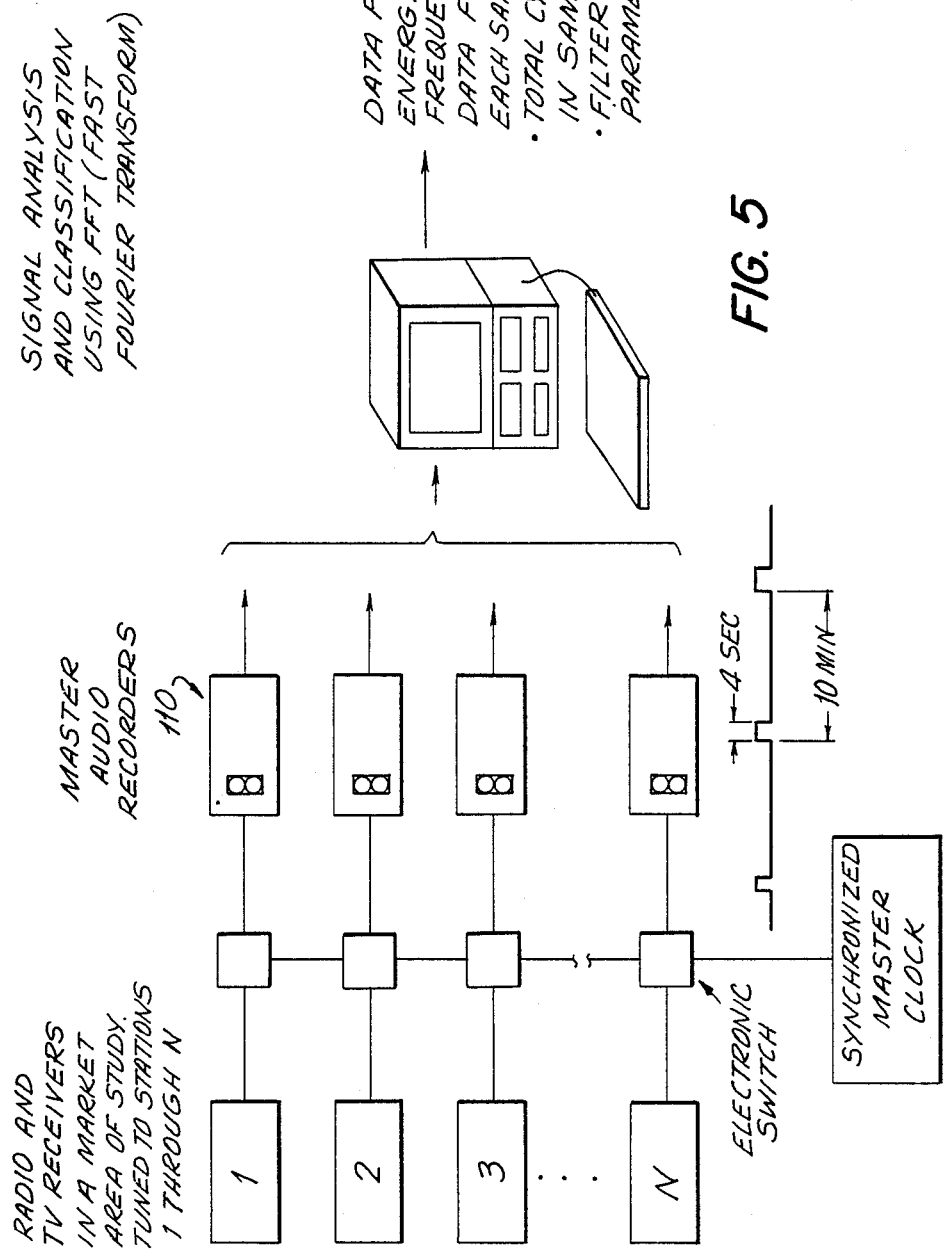
FIG. 5 is a diagrammatic illustration of the accumulative processing of the presently preferred method described herein.
Figure 6:
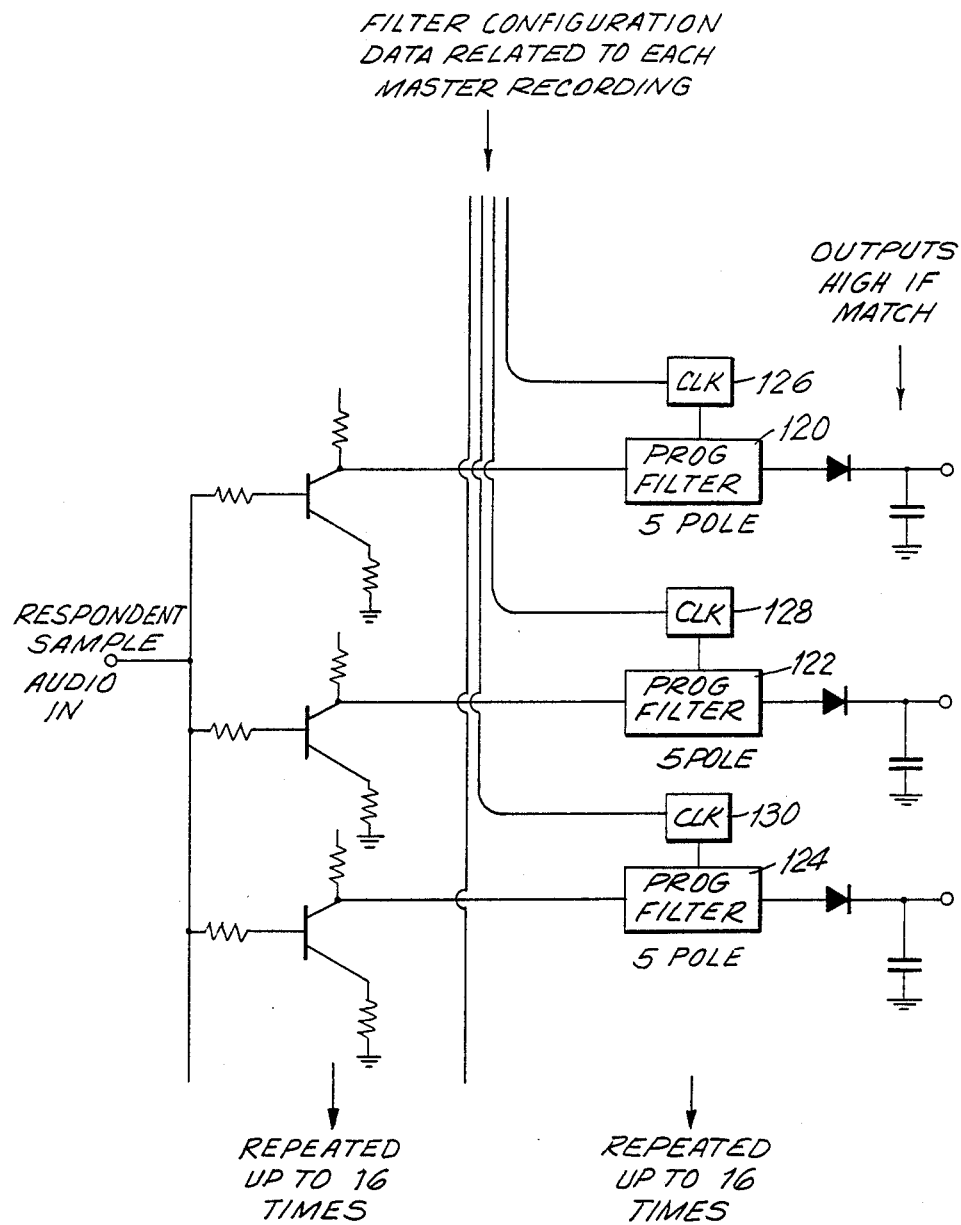
FIG. 6 is a schematic diagram, partially in block of the band pass filter array used in matching respondent samples against a master in accordance with the presently preferred method described herein.
Figure 7:
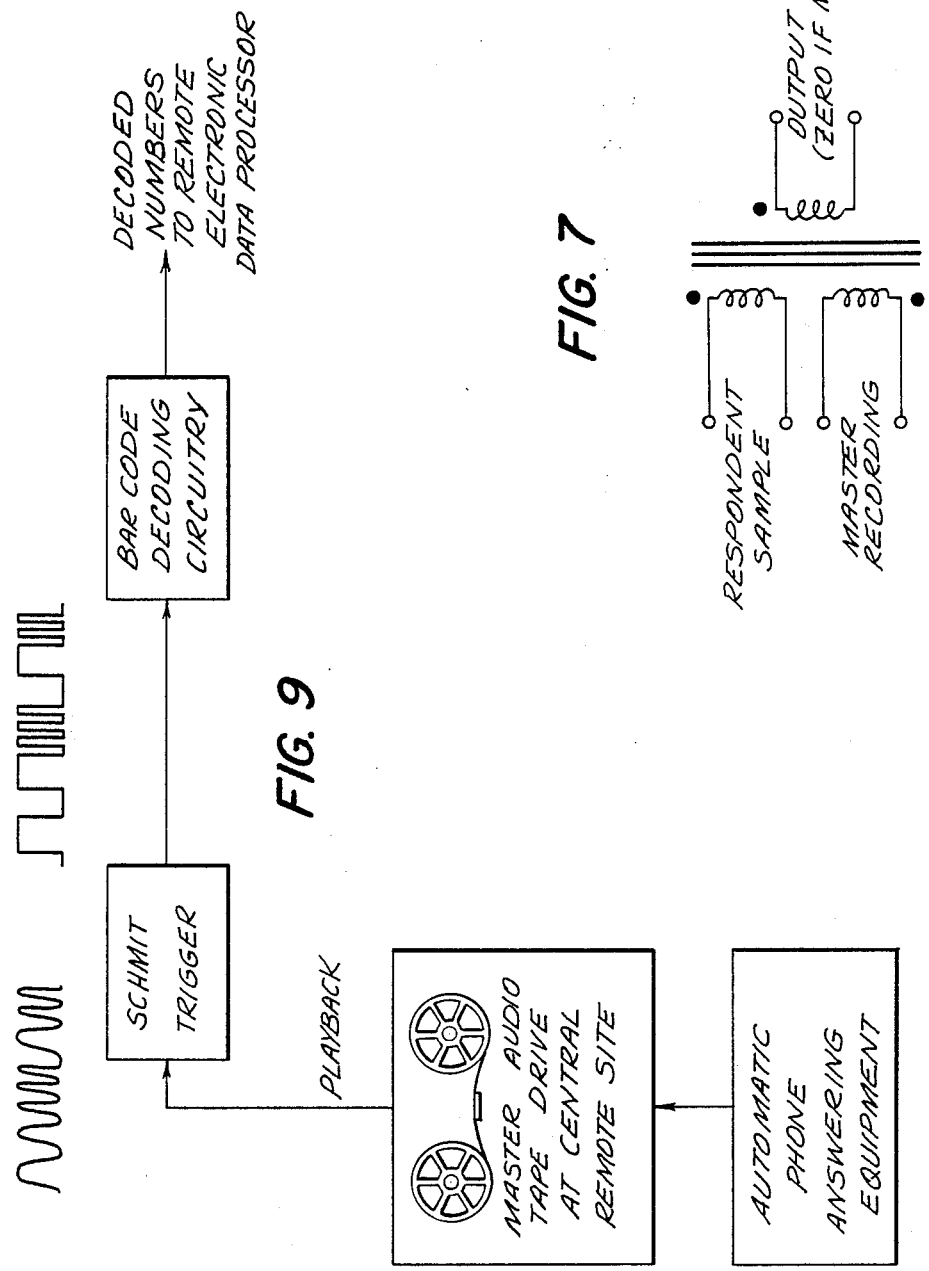
FIG. 7 is a schematic diagram of a typical circuit capable of confirming matching in accordance with the presently preferred method described herein.

In accordance with the presently preferred method described herein, and in my aforementioned copending patent application, matching of respondent audio samples to the synchronized master recording of known material is preferably performed by a combination of three steps as described below. First, the "sound snapshots", such as the 3 second example, are preferably recorded at diverse respondent locations 100, 102, 104 and, when desired, are transmitted over phone lines, or by radio (HF, VHF, UHF or microwave) links 106 to a remotely located audio recording tape drive, typically at the central processing site 108, such as diagrammatically illustrated in FIG. 2. Secondly, the master recordings of known program material being aired in the market of interest are preferably classified and analyzed. These master recordings 110 will have preferably been synchronized with the diverse respondent "sound snapshots," an important difference being however, that the master recordings 110 preferably start a little before and end a little later than the diverse respondent recordings. For example, the master recordings might be 4 seconds long, on say 10-minute intervals, and the respondent recordings might be 3 seconds long in the above example. In this way the master recording 110 will be sure to enclose the entire time window of the diverse respondent recordings. Typically up to 150 master recordings might be made in a market area of interest during a study, relating to, say, 150 radio/TV stations' programming (or other ambient sounds of interest). The master recordings 110 are preferably classified and analyzed by means of a conventional Fast Fourier Transform program and system, which can be PC-based, such as the "Waveform Analyst" as supplied by LeCroy Corporation of Spring Valley, N.Y. In addition to outputting a data file containing the sample's energy level at each frequency (in the range of 300 HZ to 3000 HZ), special conventional computer programs also can provide data about the number of cycles (a.c. sine wave cycles of any frequency) in each sample. Moreover, conventionally a special program can, based on the energy/frequency data just mentioned, compute filter parameters and store such parameters as a data file to be used as will be explained. Such a typical master recording scheme for recording, classifying and analyzing "sound snapshots" is diagrammatically illustrated in FIG. 5. Thirdly, then, the filter parameters derived above are preferably used in the presently preferred method of the present invention to configure conventional switching capacitor filters, such as an MF10 making up 5-pole band pass filters 120, 122, 124, each configured, in an array, to correspond to the frequency "signature" determined above for each master sample, as shown and preferred in FIG. 6. Such switched capacitor filters 120, 122, 124 can have their pass-bands dynamically adjusted by means of controlling clock frequencies 126, 128, 130 associated with each filter element 120, 122, 124. The data determined by the Fast Fourier Transform applied to the master recordings 110 is preferably used to set these filter clocks 126, 128 130. The diverse respondent samples are preferably passed through the array of filters 120, 122, 124 (configured for the relevant sample period) and, due to the fact that the filter array 120, 122, 124 has preferably been tailored so that known sections of it correspond on a 1-to-1 basis with the known master "signatures," the diverse respondent samples preferably drop through to specific output points, the monitoring of which thus determines the classification result and matches the diverse respondent sample to the master sample. Once a match has been tentatively made in this way, it is preferably confirmed by subtracting the sample signal from the master signal to produce a zero output, such as by using the transformer scheme of FIG. 7, with a zero output being produced when a match exists between the respondent sample and the master recording. This same type of approach is preferably also useful in classifying, analyzing and reporting on the audio data collected in the other modules of the data acquisition device 20.

Thus, individual respondents at diverse locations, who may wear individual audio recorders or the described data acquisition device 20, will have their listening behavior automatically sampled at periodic intervals, with these samples, or individual audio recordings, synchronized to a master recording of all of the programming being surveyed so that a match of audio snapshots can be sought at the central location to which the audio recordings are transmitted for purposes of generating an audience survey in accordance with the presently preferred method described herein. In this regard, it should be noted that preferably the sampling interval or window is short so as to obtain discrete samples since too large a window would produce an indication of the average of program material surveyed rather than discrete samples. In addition, preferably, the matched samples may be sorted, as a pre-processing step, at the central location so as to optimize the match of the frequency intervals of the master recording samples against the frequency intervals of the respondent diverse location audio samples.

Figure 8:
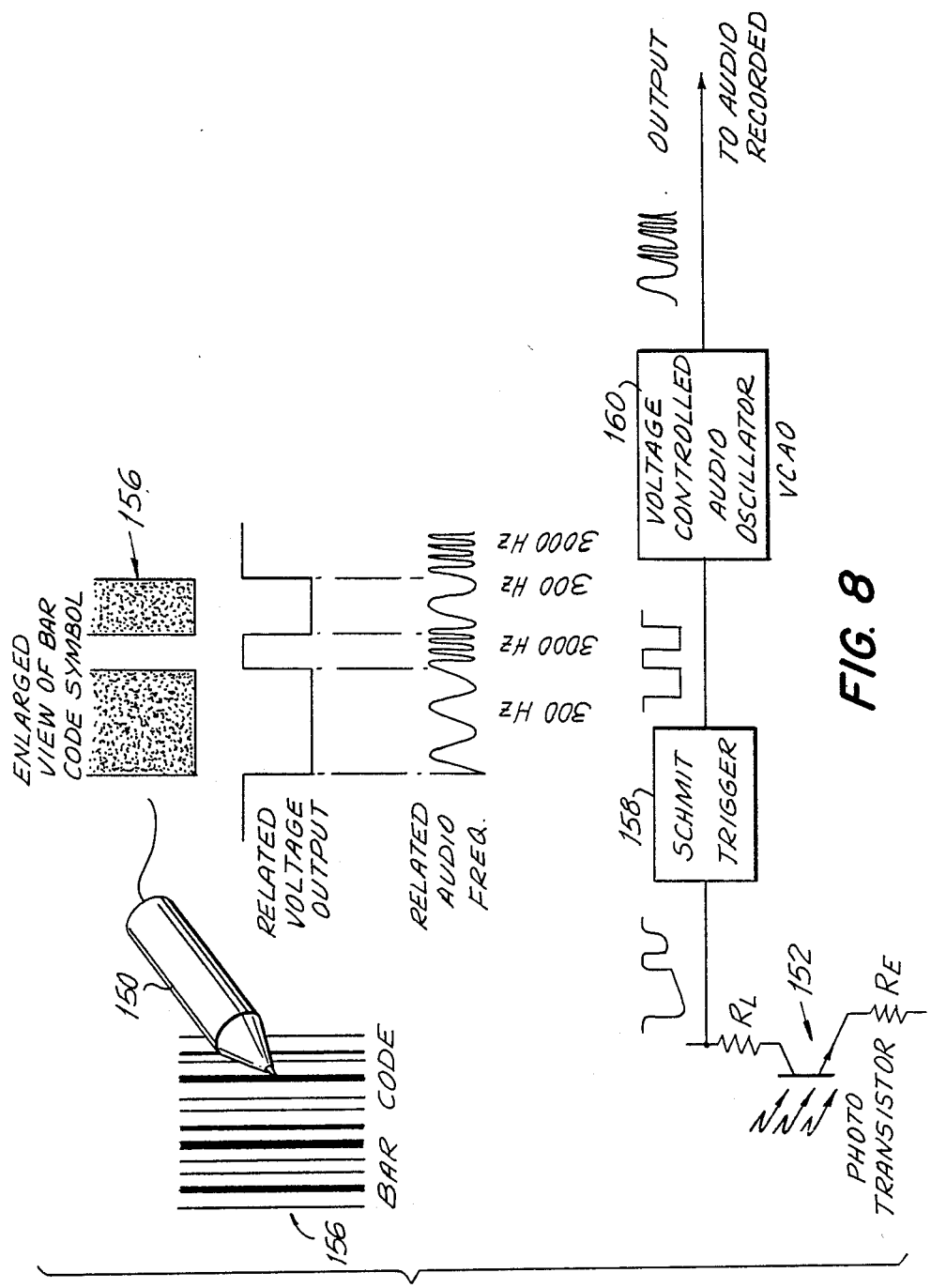
FIG. 8 is a diagrammatic illustration of a procedure for obtaining an audio signal from a bar code scan in accordance with the presently preferred method described herein.
Figure 15:
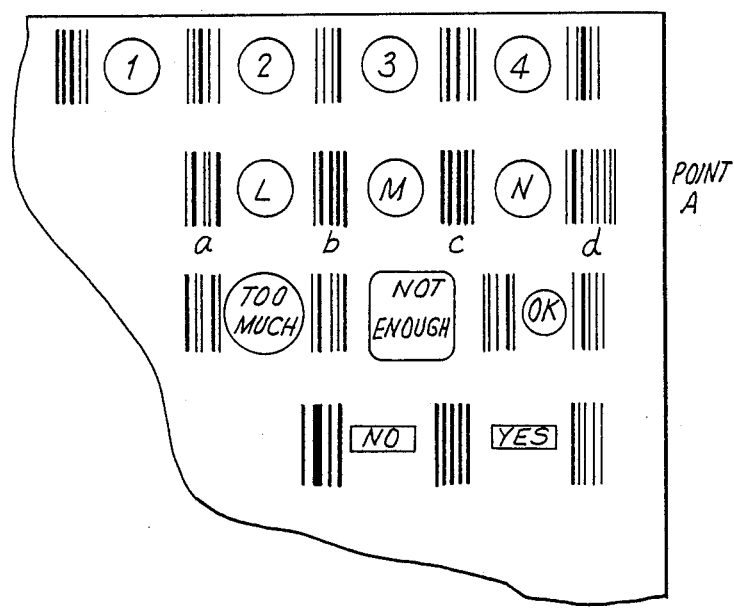
FIG. 15 is a diagrammatic illustration of a typical bar code readable data collection form usable with the presently preferred method described herein.
Figures 16, 17:
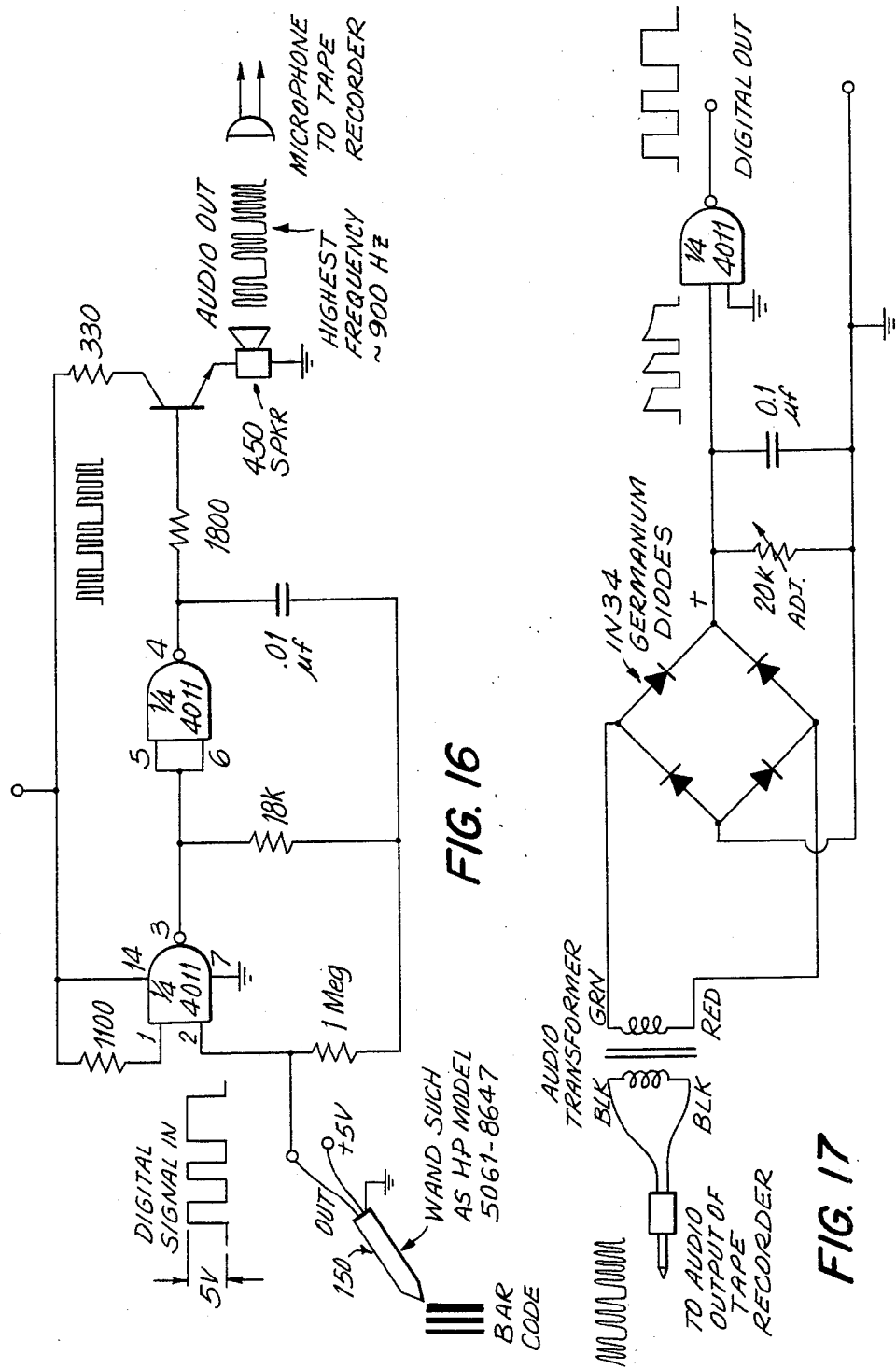
FIG. 16 is a schematic illustration, partially diagrammatic, of a typical digital to audio conversion circuit for providing scanned bar code data as audio signals in accordance with the presently preferred method described herein.
FIG. 17 is schematic illustration, partially in block, of a typical circuit for reconverting the bar code data audio output from the circuit of FIG. 16 into digital data in accordance with the presently preferred method described herein.

As shown and preferred in FIG. 1, the data acquisition device 20 also preferably includes a bar code wand sensor module 24 and bar code reader 150 for providing supplementary market survey data to the central location in the form of audio recordings of the bar code scan, such as of a UPC type product code. The bar code wand sensor 24 preferably utilizes a conventional light emitting diode and photo-transistor receptor 152 having an output current determined by the amount of light emitting diode light reflected from a bar code symbol 156, such as illustrated in FIG. 8. The output current in the photo-transistor 152 preferably varies depending on the amount of light reflected. This output current is preferably applied to the input resistor to a voltage controlled audio oscillator 160 (VCAO) through a conventional Schmitt trigger 158, (such as 74LS132) with oscillator 160 preferably producing an audio signal related in frequency to the reflectance of the bar code 156 or other surface. The circuit constants are preferably chosen so as to produce a frequency of 300 Hz from a black surface and 3,000 Hz from a white surface, assuming the frequency ranges referred to above for determining listening audience, so as to enable a single device 20 to provide a unified accumulative survey response of audience listening preference and other market survey preferences from recorded audio signals at the diverse respondent locations. When the bar code wand 150 is moved across the bar code symbol 156, say at a rate of from 3 to 30 inches per second, by way of example, the audio "signature" of the bar code 156 is preferably produced by oscillator 160 and is recorded on the recording medium, such as magnetic tape, or transmitted. By selectively interposing light filters or selectively turning off LED light sources of differing output light colors, a different signal corresponding to different surface colors can be produced. Generally, however, the Particular color is not needed; in which case only the bar code 156 or some other image is recorded by this module 24. As shown and preferred, by way of example, in FIG. 9, upon playback, the audio signal may be re-digitized and processed in the normal way at the remote (central) electronic data processor, such as by having a table look up relating the bar code audio signatures to the digital bar code equivalent. As further shown and preferred in FIGS. 16 and 17, circuitry for converting the digital bar code scan into audio signals is shown, by way of example (FIG. 16), as is circuitry for reconverting the recorded audio signal which has been transmitted to the central location 108 back into the digital equivalent of the scanned bar code (FIG. 17). The circuit of FIG. 16 assumes, by way of example, the use of a conventional bar code wand 150 such as an HP Model 5061-8647. FIG. 15, by way of example, illustrates a typical bar code readable data collection form, with the bar code numbers preferably being chosen to uniquely define each location, such as 01, 01 to 99, 99, which would define a matrix of 99×99. In use with this form the bar code wand 150 is preferably scanned right to left, starting with the chosen response area. In the example of FIG. 15, if "M" were the chosen answer, the wand 150 would be placed with its tip on "M" and then scanned all the way over to point "A" or, at least past the bar code to designate point "M". The resulting signal, which contains the bar code data at "c" and "d", are preferably processed or tape recorded for later transmission and/or decoding.

Figure 10:
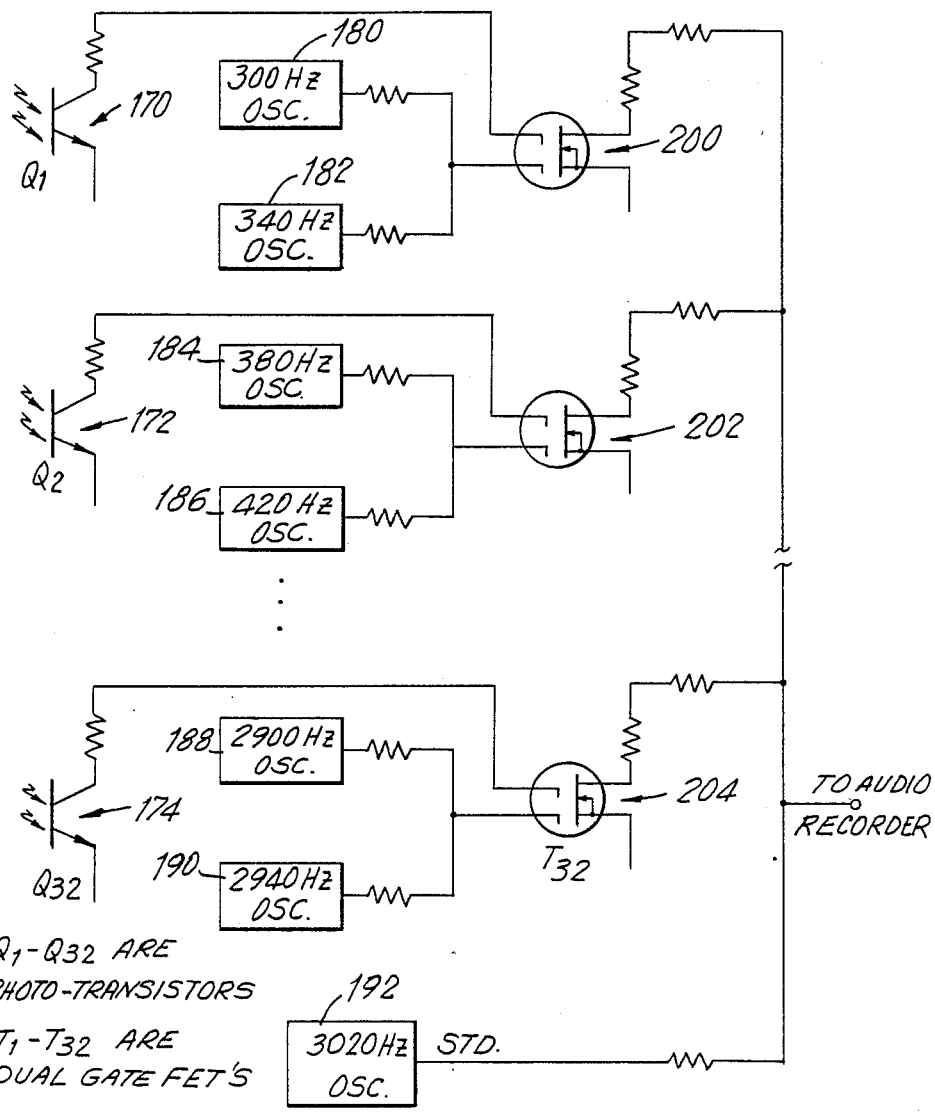
FIG. 10 is a schematic diagram, partially in block, of macro image circuits usable with the presently preferred method described herein.

In addition to the bar code audio input from sensor 24 and the audio snapshot from sensor 22, audio information is also collected by the macro imager sensor module 28. This macro imager sensor module 28 is preferably comprised of a hand-held or otherwise mounted bar (the "macro data bar") which comprises a line of photo-transistors 170, 172, 174, by way of example (FIG. 10) which is passed over large images of up to 12" in width to produce a complex audio frequency signature. For example, if an automobile license plate is scanned, its audio signature can later be decoded to reproduce an image corresponding to the original license number image. In order to accomplish this, the "macro data bar" preferably utilizes a specific pair of unique audio frequency base signals for each of the individual photo-transistors 170, 172, 174. The amplitude of the audio frequencies is preferably varied by each photo-transistor circuit 170, 172, 174 depending on the reflected light level sensed. There are preferably 32 individual photo-transistors in the "macro data bar," with only three such photo-transistors 170, 172, 174 being illustrated in FIG. 10. The first photo-transistor 170 preferably modulates a frequency pair of 300 Hz and 340 Hz provided from oscillators 180, 182. The second one, photo-transistor 172, preferably modulates a frequency pair of 380 Hz and 420 Hz from oscillator 184, 186. Similarly, 40 Hz steps are preferably used up to the 32nd photo-transistor 174 which preferably modulates a 2,900 Hz and 2,940 Hz frequency pair from oscillators 118, 190. In addition, a 3,020 Hz time standard signal from an oscillator 192 is preferably recorded continuously. The 3,020 Hz signal preferably allows for frequency "correction" at decoding time. As shown and preferred, each frequency pair is supplied to a dual gate FET, with dual FET 200, 202 and 204, respectively, being illustrated in FIG. 10. The macro-imager signature is preferably decoded using Fast Fourier Transform analysis of the signal, and cascaded electronic filters which separate the individual data inputs by classifying the frequency of the signals received. To facilitate this operation, certain subgroups within the photo-transistor array may preferably be recorded on separate channels of the recording media and each channel preferably transmitted or stored separately. For other applications, all frequencies are preferably mixed on one tape.

Referring now to the presently preferred data tablet sensor module 26, which is described in the aforementioned copending application, and which is illustrated in greater detail in FIGS. 11-14, and FIG. 18, the data tablet sensor module 26 is preferably comprised of a flat or curved working surface 210 of approximately 10"×12" that accommodates an ordinary 8½"×11" piece of ordinary paper, such as a market survey questionnaire, a data entry or data collection source form, or any other information collection document. The document normally indicates places for making the desired responses on certain areas of the form.

Figure 11:
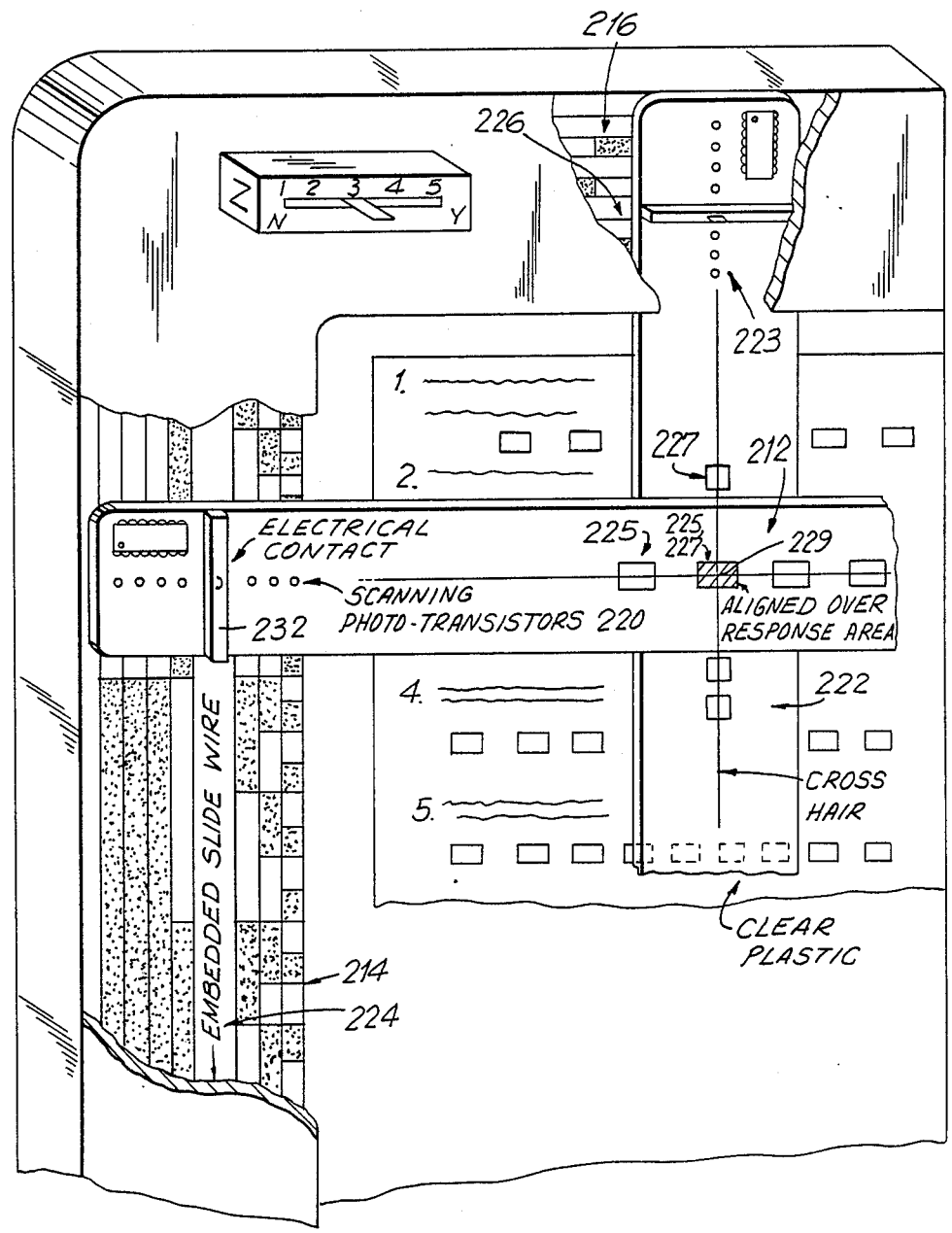
FIG. 11 is a cutaway diagrammatic illustration of a data tablet sensor usable in the device of FIG. 1.
Figure 12:
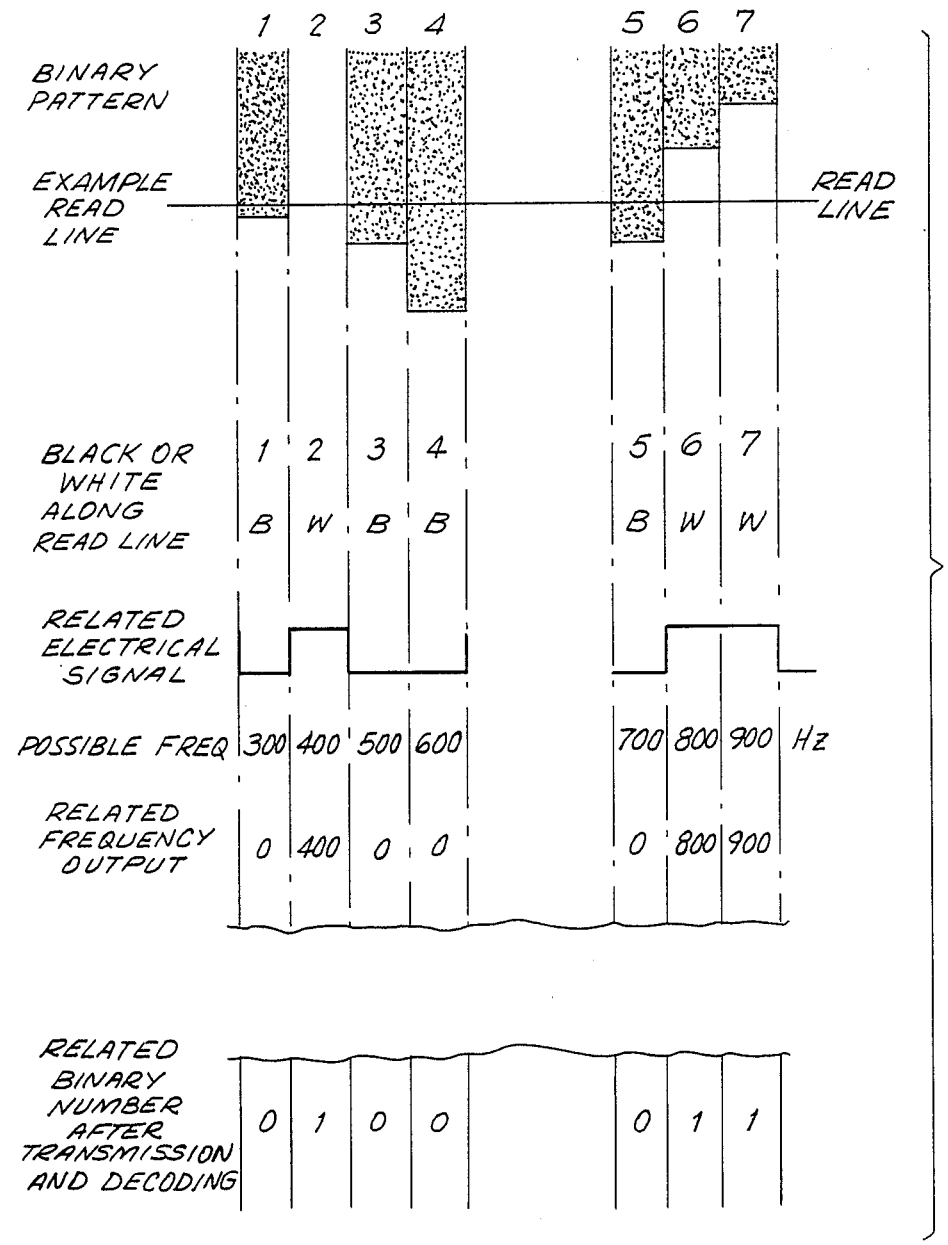
FIG. 12 is a diagrammatic illustration of the data output circumstances of the sensor of FIG. 11.
Figure 13:
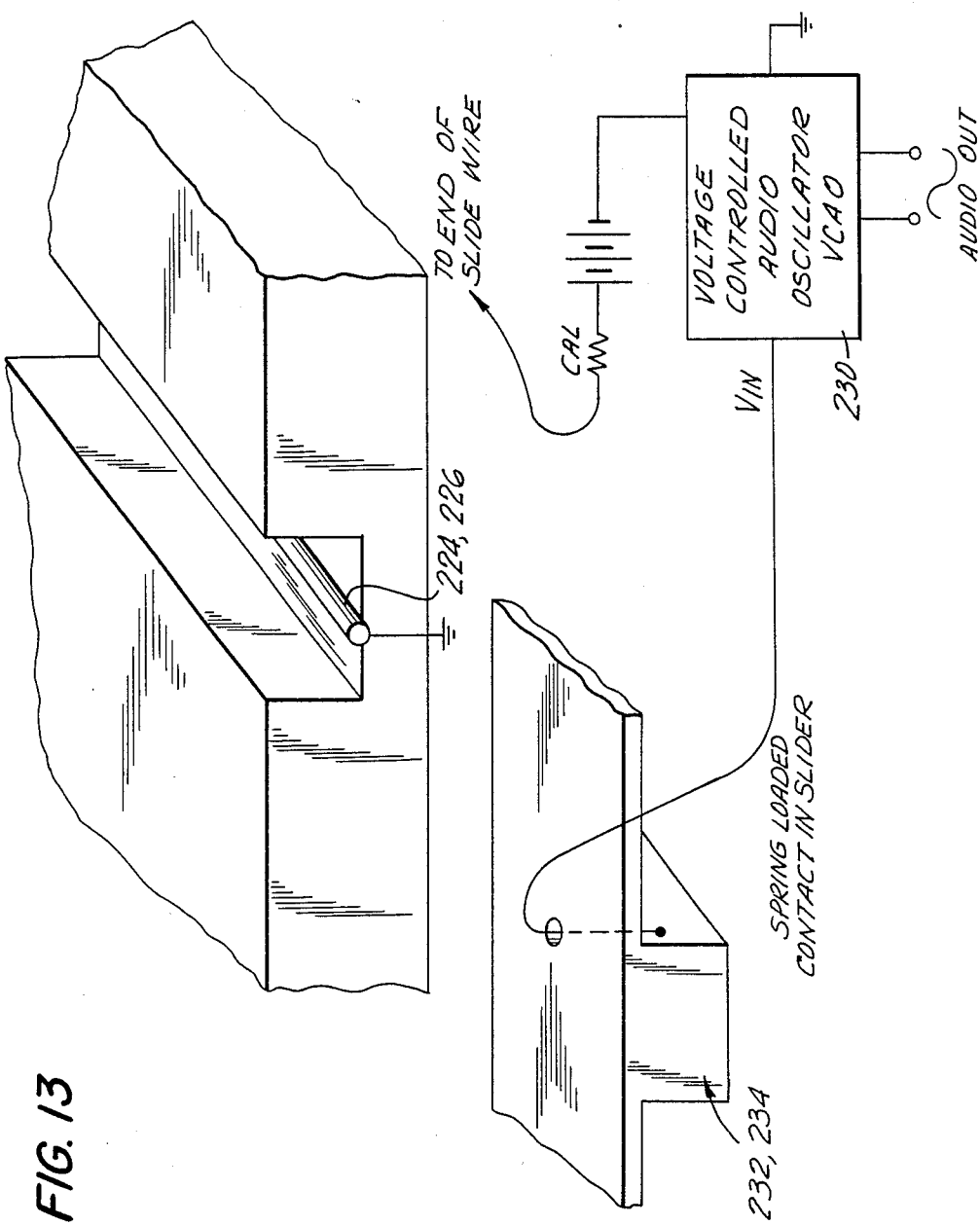
FIG. 13 is a diagrammatic illustration of a slide wire as a position sensor usable with the presently preferred method described herein.
Figure 18:
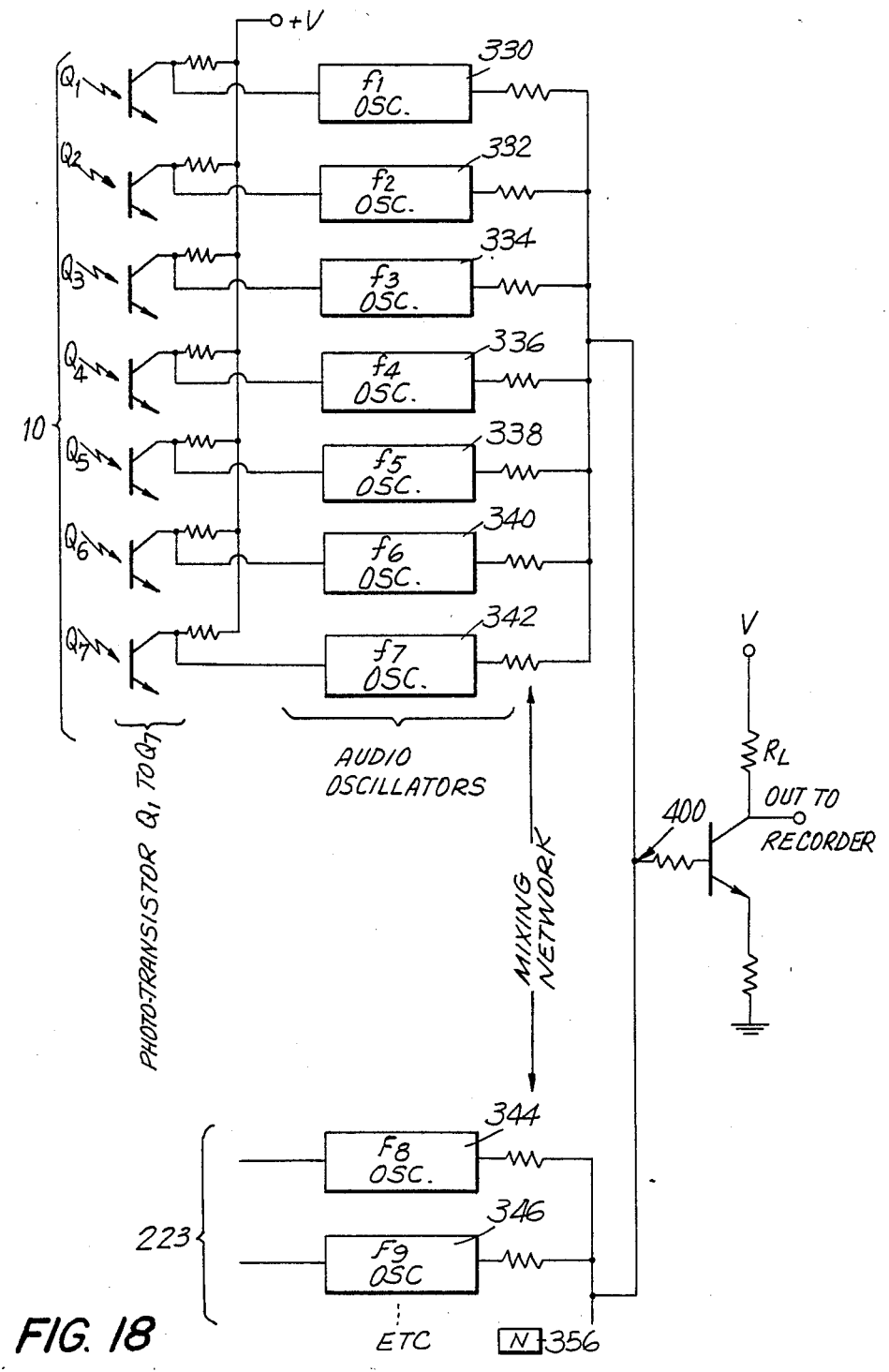
FIG. 18 is a schematic diagram, partially in block, of a typical preferred audio conversion circuit for use in the data tablet sensor of FIG. 11 for providing audio signatures from marked data responses.

A movable cursor 212, 222 is preferably used that produces an audio signature indicating both its position and relative motion in any of three axes, say x, y or z, such as shown in FIGS. 11 and 18. The cursor 212, 222 is preferably mechanically connected to shaded bars 214 along the side (y-coordinate) and top 216 (x-coordinate) of the tablet 26 which cause a composite of audio frequencies to be produced. The x-axis markings provide a binary pattern that is "read" by photo-transistors 220, that are either off for black bars or on for white or clear bars and the y-axis markings provide a binary pattern that is "read" by photo-transistors 223. There are preferably 7 possible black/white bar areas along the top and the side, giving a possibility of 128 specific locations along either axis, such as illustrated in FIG. 12. The seven photo-transistors 220 along the x-axis each correspond to one of seven unique frequencies between 300 Hz and 1,000 Hz that are spaced 100 Hz apart. Similarly, the y-axis photo-transistors 223 produces a simultaneous pattern of seven unique frequencies between 1,100 Hz and 1,800 Hz that are spaced 100 Hz apart. FIG. 18 illustrates a presently preferred typical audio conversion circuit usuable with the photo-transistor 220, 223. As shown and preferred in FIG. 18, each of the transistors Q1-Q7 comprising transistor array 220, and transistors Q8-Q14 comprising transistor array 223 is associated with a different voltage controlled audio oscillator 330 through 342 and 344 through 356, with the selected outputs being mixed together to provide a composite audio frequency which is ultimately summed at point 400 from which it can be recorded.

Figure 14:
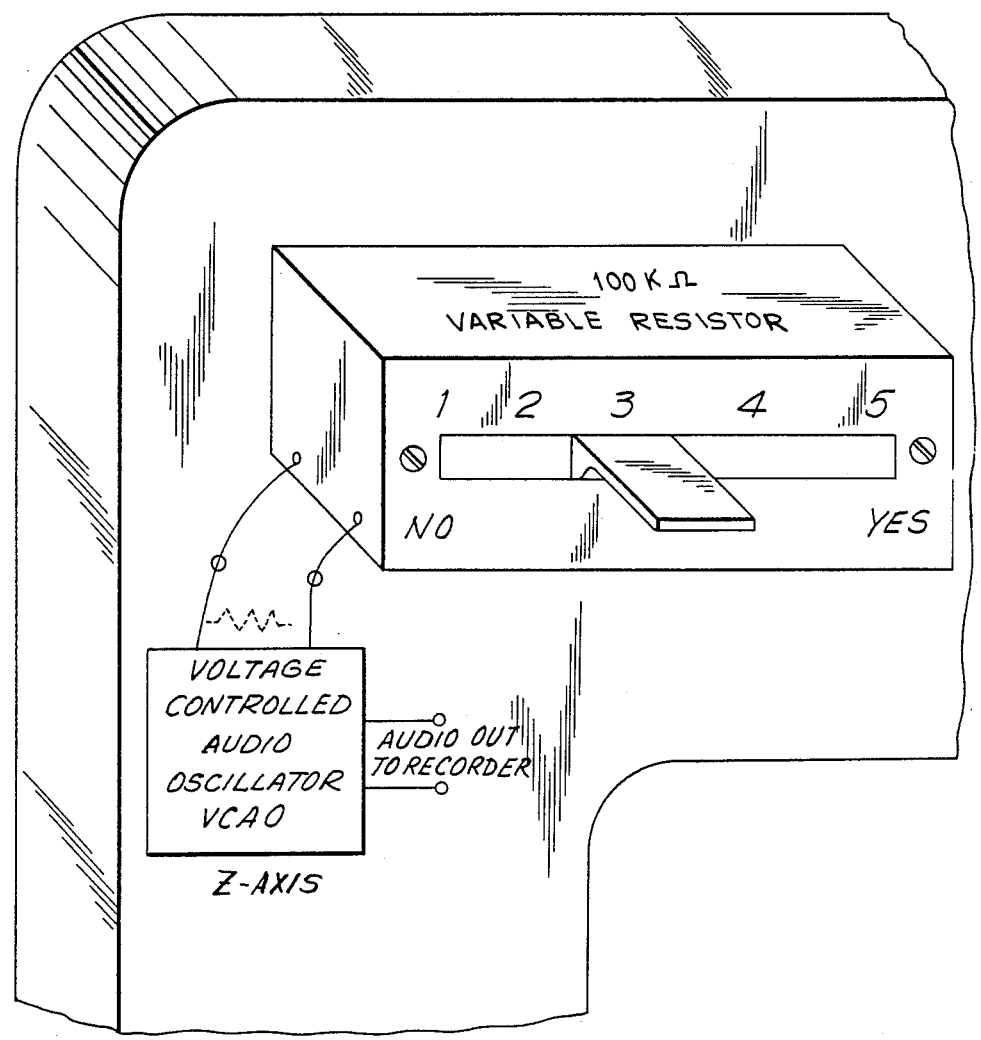
FIG. 14 is a diagrammatic illustration of a device for providing Z-axis data via a variable resistor for use with the presently preferred method described herein.

A specific x-y position is determined by moving the x and y members 212, 223 until their windows 225, 227 respectively, are aligned and intersect over a marked response area 229. After a specific x-y position is determined, the Data Tablet Sensor Module 26 can preferably momentarily be put into an "expand resolution mode" by switching the x-y position sensor momentarily to a resistance slide wire pick-up 224, 226 (see FIG. 13) on the x and y axes. This provides a higher resolution surface in the vicinity of the x-y position that was previously determined on the surface which graphical data including handprint, handwriting and other symbols can be recorded as audio signals. A voltage proportional to the position along the slide wires 224, 226 is preferably converted into an audio "image" via a conventional voltage controlled audio oscillator 230 (VCAO) The output is then preferably transmitted or stored. The audio signals are subsequently reconverted into the original tracing or movement of the cursor. In this high resolution mode of operation, this module can collect open ended responses to questions, or other symbols, tracings, shapes and so forth. Similarly, sensors for a third dimension can be added to the data tablet 26 to record additional data as shown in FIG. 11. Thus, an additional response on the z axis that is associated with any x-y coordinate point indicating an answer to a given survey question can be recorded, such as the value $1.25, or related additional "yes" or "no", such as illustrated in FIG. 14.

Thus, by utilizing the presently described method and the apparatus of the present invention, audio frequency information can be used to capture various types of audience preferences, such as a listening audience survey for radio and/or television programs, as well as other supplementary market survey data. In this regard, if desired, for example, each respondent may merely be provided with a portable microcassette tape recorder, synchronized to the master recordings, as opposed to the complete data acquisition device 20, to obtain listening audience data in accordance with the present invention without departing from the spirit and scope hereof.

What is claimed is:

1. An audio frequency based data capture tablet apparatus for converting marked data responses into corresponding audio information, said tablet comprising:
a working surface capable of receiving a data collection document thereon having collected information stored therein in a response area in the form of marked data substantially orthogonally definable on said working surface;
a pair of substantially normal binary encoded optically readable sections associated with said work surface and capable of orthogonally defining a plurality of unique positions on said document response area disposed on said working surface;
a movable cursor means mechanically disposed above said working surface and comprising a normal pair of orthogonally movable intersecting members, one of said members being movable along an x-axis and the other of said members being movable along a y-axis to uniquely define an aligned position on said document response area where a given response has been marked, each of said members comprising a plurality of spaced apart windows optically alignable over a plurality of possible marked responses to a given data collection inquiry, said windows intersecting over the marked answer to said inquiry, said members further comprising a plurality of spaced apart phototransistors optically alignable over said binary encoded optically readable sections in conjunction with said orthogonal movement of said members, each of said binary encoded optically readable sections comprising a plurality of unique optically readable binary patterns uniquely defining said position, each of said phototransistors being selectively connected to drive a voltage controlled audio oscillator means for providing a unique audio frequency output dependent on the binary coded pattern present in said binary encoded optically readable section associated with said phototransistors at said aligned position on said document response area where said given response has been marked, said phototransistor enabling said voltage controlled audio oscillator means when said phototransistor is enabled by reading said binary coded pattern, said movable cursor means producing a composite of audio frequencies when said cursor means is at said aligned position on said document response area, said phototransistors associated with said x-axis movable member being capable of producing a first pattern of a plurality of different spaced apart predetermined audio frequencies in conjunction with said voltage controlled audio oscillator means and said phototransistors associated with said y-axis movable member being capable of producing a second pattern of a plurality of different spaced apart predetermined audio frequencies in conjunction with said voltage controlled oscillator means; whereby said composite of audio frequencies is provided at said aligned position for providing a unique audio signature corresponding to said marked response area position for converting the marked answer to said given data collection inquiry into corresponding audio information.

2. An apparatus in accordance with claim 1 wherein said binary encoded optically readable sections further comprise a resistance slide wire embedded therein, each of said movable members having an electrical wire pick-up means disposed thereon in electrical alignment with said slide wire, said electrical wire pick-up means being electrically connected to an input of a voltage controlled audio oscillator means for producing an audio output based on the position of said wire pick-up along said slide wire, said wire pick-up producing a voltage proportional to said position as said input, said wire pick-up and slide wire providing an expanded resolution mode complementary to said phototransistor.

3. An apparatus in accordance with claim 1 wherein said different spaced apart audio frequencies are substantially spaced apart by 100 Hz.

4. An apparatus in accordance with claim 3 wherein said x-axis phototransistors produce a pattern of said audio frequencies substantially between 300 Hz and 1000 Hz.

5. An apparatus in accordance with claim 4 wherein said y-axis phototransistors produce a pattern of said audio frequencies substantially between 1100 Hz and 1800 Hz.

6. An apparatus in accordance with claim 1 wherein said x-axis phototransistors produce a pattern of said audio frequencies substantially between 300 Hz and 1000 Hz.

7. An apparatus in accordance with claim 6 wherein said y-axis phototransistors produce a pattern of said audio frequencies substantially between 1100 Hz and 1800 Hz.

8. An apparatus in accordance with claim 1 wherein said y-axis phototransistors produce a pattern of said audio frequencies substantially between 1100 Hz and 1800 Hz.

9. An apparatus in accordance with claim 8 wherein said different spaced apart audio frequencies are substantially spaced apart by 100 Hz.

10. An apparatus in accordance with claim 1 wherein said first pattern of audio frequencies comprises seven unique frequencies.

11. A apparatus in accordance with claim 10 wherein said second pattern of audio frequencies comprises seven unique frequencies.

12. An apparatus in accordance with claim 11 wherein said y-axis phototransistors produce a pattern of said audio frequencies substantially between 1100 Hz and 1800 Hz.

13. An apparatus in accordance with claim 12 wherein said different spaced apart audio frequencies are substantially spaced apart by 100 Hz.

14. An apparatus in accordance with claim 10 wherein said x-axis phototransistors produce a pattern of said audio frequencies substantially between 300 Hz and 1000 Hz.

15. An apparatus in accordance with claim 14 wherein said different spaced apart audio frequencies are substantially spaced apart by 100 Hz.

16. An apparatus in accordance with claim 15 wherein said y-axis phototransistors produce a pattern of said audio frequencies substantially between 1100 Hz and 1800 Hz.

17. An apparatus in accordance with claim 16 wherein said second pattern of audio frequencies comprises seven unique frequencies.

18. An apparatus in accordance with claim 1 wherein said second pattern of audio frequencies comprises seven unique frequencies.

19. An apparatus in accordance with claim 1 further comprising additional sensor means for providing supplemental audio information corresponding to said marked response area.

20. An apparatus in accordance with claim 1 wherein each of said phototransistors is associated with a different audio frequency.

21. An apparatus in accordance with claim 20 wherein said first pattern of audio frequencies at said aligned position is capable of selectively comprising one or more of said plurality of different audio frequencies dependent on which phototransistors are enabled by said binary coded pattern when read.

22. An apparatus in accordance with claim 21 wherein said second pattern of audio frequencies at said aligned position is capable of selectively comprising one or more of said plurality of different audio frequencies dependent on which phototransistors are enabled by said binary coded pattern when read.

23. An apparatus in accordance with claim 20 wherein said second pattern of audio frequencies at said aligned position is capable of selectively comprising one or more of said plurality of different audio frequencies dependent on which phototransistors are enabled by said binary coded pattern when read.

24. An apparatus in accordance with claim 20 wherein said different spaced apart audio frequencies are substantially spaced apart by 100 Hz.

25. An apparatus in accordance with claim 24 wherein said x-axis phototransistors produce a pattern of said audio frequencies substantially between 300 Hz and 1000 Hz.

26. An apparatus in accordance with claim 25 wherein said y-axis phototransistors produce a pattern of said audio frequencies substantially between 1100 Hz and 1800 Hz.

27. An apparatus in accordance with claim 24 wherein said y-axis phototransistors produce a pattern of said audio frequencies substantially between 1100 Hz and 1800 Hz.

28. An apparatus in accordance with claim 1 wherein said first pattern of audio frequencies at said aligned position is capable of selectively comprising one or more of said plurality of different audio frequencies dependent on which phototransistors are enabled by said binary coded pattern when read.

29. An apparatus in accordance with claim 28 wherein said second pattern of audio frequencies at said aligned position is capable of selectively comprising one or more of said plurality of different audio frequencies dependent on which phototransistors are enabled by said binary coded pattern when read.

30. An apparatus in accordance with claim 1 wherein said second pattern of audio frequencies at said aligned position is capable of selectively comprising one or more of said plurality of different audio frequencies dependent on which phototransistors are enabled by said binary coded pattern when read.

31. An apparatus in accordance with claim 1 further comprising mixing means associated with said first pattern audio oscillator means output for mixing said first pattern of audio frequencies together at said aligned position to produce a composite audio information signal associated with said x-axis member.

32. An apparatus in accordance with claim 31 wherein said mixing means further comprises means associated with said second pattern audio oscillator means output for mixing said second pattern of audio frequencies together at said aligned position to produce a composite audio information signal associated with the y-axis member.

33. An apparatus in accordance with claim 32 wherein mixing means further comprises means for combining said associated composite audio information signals for producing said composite of audio frequencies when said cursor means is at said aligned position.

34. An apparatus in accordance with claim 33 wherein each of said phototransistors is associated with a different audio frequency.

35. An apparatus in accordance with claim 34 wherein said first pattern of audio frequencies at said aligned position is capable of selectively comprising one or more of said plurality of different audio frequencies dependent on which phototransistors are enabled by said binary coded pattern when read.

36. An apparatus in accordance with claim 35 wherein said second pattern of audio frequencies at said aligned position is capable of selectively comprising one or more of said plurality of different audio frequencies dependent on which phototransistors are enabled by said binary coded pattern when read.

37. An apparatus in accordance with claim 31 wherein each of said phototransistors is associated with a different audio frequency.

38. An apparatus in accordance with claim 37 wherein said mixing means further comprises means associated with said second pattern audio oscillator means output for mixing said second pattern of audio frequencies together at said aligned position to produce a composite audio information signal associated with the y-axis member.

* * * * *